United States Patent
Simon et al.

(10) Patent No.: US 11,118,671 B2
(45) Date of Patent: Sep. 14, 2021

(54) PROCESS FOR THE ASSEMBLY OF A GEAR TRAIN

(71) Applicant: SAFRAN TRANSMISSION SYSTEMS, Colombes (FR)

(72) Inventors: Adrien Louis Simon, Moissy-Cramayel (FR); Clément Paul René Niepceron, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 117 days.

(21) Appl. No.: 16/395,681

(22) Filed: Apr. 26, 2019

(65) Prior Publication Data

US 2019/0331212 A1     Oct. 31, 2019

(30) Foreign Application Priority Data

Apr. 26, 2018  (FR) ..................................... 1853650

(51) Int. Cl.
  *F16H 57/08*  (2006.01)
  *F16H 1/28*   (2006.01)
  (Continued)

(52) U.S. Cl.
  CPC ............. *F16H 57/082* (2013.01); *F16H 1/28* (2013.01); *F02C 7/36* (2013.01); *F02K 3/06* (2013.01); *F05D 2260/40311* (2013.01)

(58) Field of Classification Search
  CPC ................................ F16H 57/082; F16H 1/28
  See application file for complete search history.

(56) References Cited

U.S. PATENT DOCUMENTS

| 4,759,229 A | * | 7/1988 | Takahashi | ............. F16H 57/082 |
| | | | | 74/409 |
| 8,480,527 B2 | * | 7/2013 | Snyder | ...................... F02C 7/36 |
| | | | | 475/162 |

(Continued)

FOREIGN PATENT DOCUMENTS

FR           2 914 719 A1     10/2018

OTHER PUBLICATIONS

French Application No. 1853650; Search Report dated Jan. 29, 2019—12 pgs. (relevance found in the citations therein).

*Primary Examiner* — Derek D Knight
(74) *Attorney, Agent, or Firm* — Lathrop GPM LLP

(57) ABSTRACT

The invention concerns a process for the assembly of an epicyclic or planetary gear train from at least one pivot (18) and a planet gear carrier (20) comprising one or more bores, each of said bores being intended to receive a pivot (18), the process comprising the following steps:

a) measuring the position of a real axis of each of said at least one pivot (18) and of said one or more bores of carrier (20);

b) dividing each of said pivots (18) into n angular sectors $i_1 \ldots i_q \ldots i_n$ extending about the theoretical axis of said pivot and dividing each of said holes of the carrier (20) into k angular sectors $j_1 \ldots j_l \ldots j_k$ extending about the theoretical axis of said bore;

c) for each pivot (18), defining a vector $\vec{V}$ oriented from the theoretical axis to the real axis, and identifying the angular sector $i_q$ including vector $-\vec{V}$;

d) for each bore, defining a vector $\vec{U}$ oriented from the theoretical axis to the real axis, and identifying the angular sector $j_l$ including vector $\vec{U}$;

(Continued)

e) for each bore of the carrier (20), mounting a pivot in such a way that for each mounting, the identified angular sectors $j_l$ and $i_q$ are superimposed.

14 Claims, 4 Drawing Sheets

(51) Int. Cl.
    *F02C 7/36*     (2006.01)
    *F02K 3/06*     (2006.01)

(56) References Cited

U.S. PATENT DOCUMENTS

| | | | |
|---|---|---|---|
| 10,781,911 B2 * | 9/2020 | Payne | F16C 19/44 |
| 2010/0056321 A1 | 3/2010 | Snyder et al. | |
| 2013/0251511 A1 * | 9/2013 | Coffin | F16H 57/082 |
| | | | 415/122.1 |

* cited by examiner

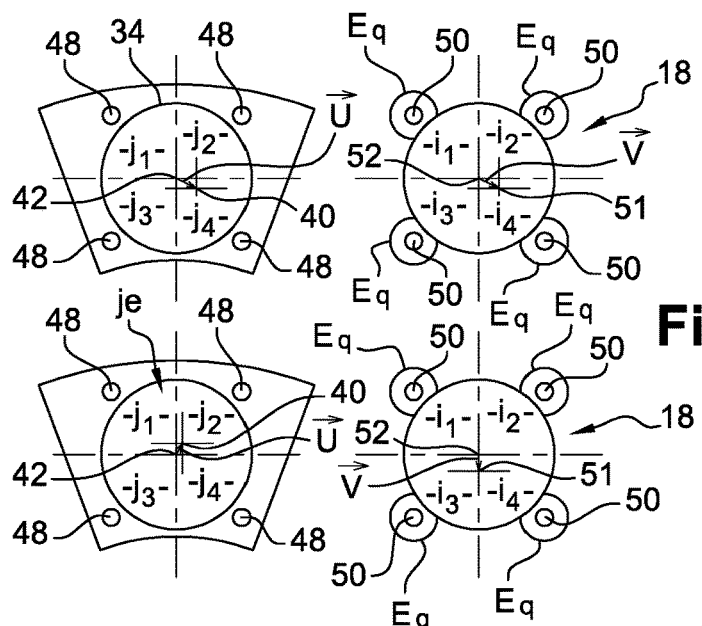
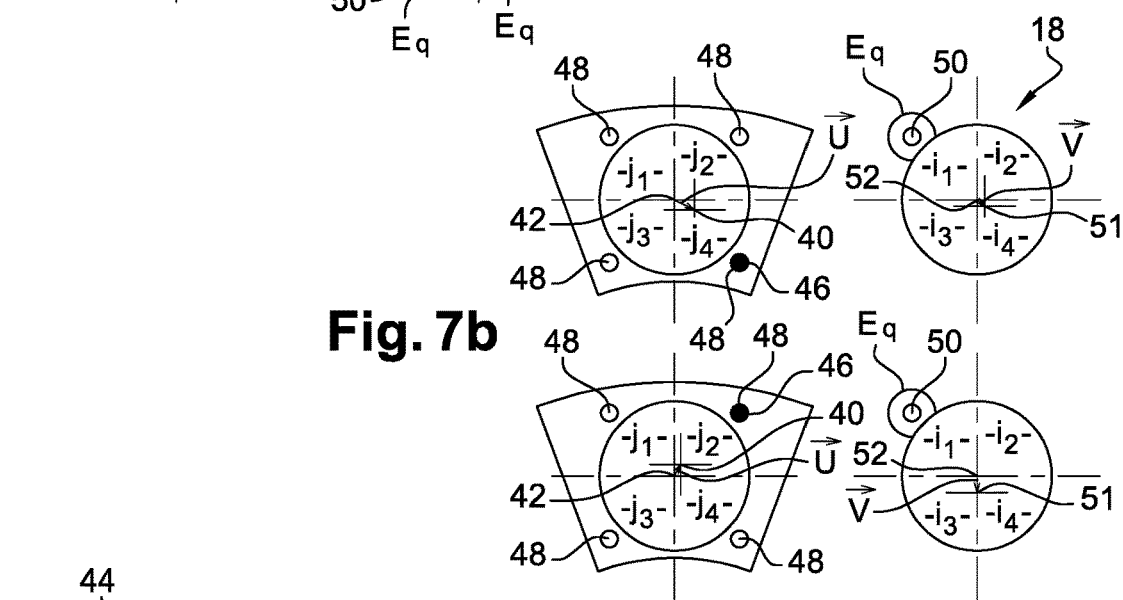
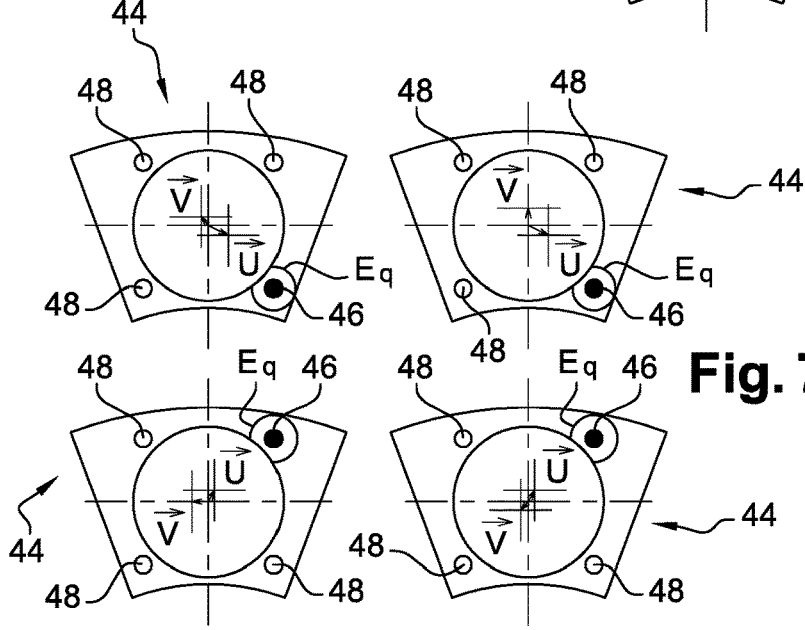
Fig. 7a
Fig. 7b
Fig. 7c

PROCESS FOR THE ASSEMBLY OF A GEAR TRAIN

CROSS-REFERENCE TO RELATED APPLICATION

This application claims priority to French Patent Application No. 1853650, filed Apr. 26, 2018, which is incorporated herein by reference.

DOMAIN OF THE INVENTION

This invention concerns a process for the assembly of an epicyclic or planetary gear train intended to equip a turbine engine, such as a turbojet or an aircraft turboprop.

BACKGROUND

A turbine engine may include a gear train connecting its turbine shaft to one or more output elements, such as a fan impeller, for example. This type of gear train includes an inner planet gear (also called a sun gear) driven by an input shaft, for example a turbine shaft, an outer planet gear (also called a ring gear), coaxial with the sun gear, with planet gears meshing with both the sun and ring gears, and a planet gear carrier whereon the planet gears are mounted to rotate. The planet gears are mounted in a mobile and rotating manner on pivots that are inserted into the bores of the carrier.

In a particular configuration, the gear train can reduce the speed between an input and an output of the gear train. The variation in the reduction ratio of such a gear train is obtained by modifying the number of teeth of the sun gear, planet gears and ring gear, and by the architecture of the gearbox, i.e. epicyclic or planetary. These two types of gear trains differ from each other in that in the so-called epicyclic gear train, the ring gear is fixed and the carrier is free to rotate. Conversely, in the so-called planetary gear train, the planet gear carrier is stationary and the ring gear is free to rotate.

In the case of these two types of gear trains, there is a disparity in the power passing through the planet gears of the carrier. This disparity may result in an overload of mechanical stresses applied to some planet gears.

According to the ANSI/AGMA 6123-B06 standard established by the *American Gear Manufacturers Association* (AGMA), the overload of each planet gear of an epicyclic or planetary gear train must be approximately 12%, under actual operating conditions.

One of the causes of this disparity is the relative positioning error of planet gears, and in particular the relative tangential positioning error of planet gears relative to each other around the carrier axis. In addition, the misalignment of the planet gears with the gears of the sun and ring gears leads to premature wear of said gears, requiring regular maintenance and increasing the operating costs of the turbine engine.

In current technology, one solution to reduce this overload phenomenon is to pair the planet gear pivots and the bores in the carrier during machining and assembly of the parts. Pairing consists of coupling pivots to bores, so that the pivot and the bore of a couple are intended to be assembled together. One consequence of such a pairing is that the pivots of two couples are not interchangeable.

Pairing makes it more complex to manage parts inventories when assembling or maintaining epicyclic gear trains. In addition, pairing operations are constraining since they require complex assembly tasks prior to the assembly of the carrier components, which leads to high production costs and makes maintenance operations more complex.

One of the main objectives of the invention is to reduce planet gear positioning errors in the carrier in a simple, efficient and economical way, without having to use pairing of parts or changing the manufacturing tolerances of the carrier and pivots, which could significantly increase manufacturing costs.

For this purpose, the present invention concerns a process for assembling an epicyclic or planetary gear train from at least one pivot and a carrier comprising one or more bores, each of the bores being intended to receive a pivot, the method comprising the following steps:

a) measuring the position of a real axis of each of said at least one pivot and of said one or more bores of carrier;

b) dividing each of said pivots into n angular sectors $i_1 \ldots i_q \ldots i_n$ extending about the theoretical axis of said pivot and dividing each of said bores of the carrier into k angular sectors $j_1 \ldots j_l \ldots j_k$ extending about the theoretical axis of said bore;

c) for each pivot, defining a vector $\vec{V}$ oriented from the theoretical axis to the real axis, and identifying the angular sector $i_q$ including vector $-\vec{V}$;

d) for each bore, defining a vector $\vec{U}$ oriented from the theoretical axis to the real axis, and identifying the angular sector $j_l$ including the vector $\vec{U}$;

e) for each bore of the carrier, mounting of a pivot in such a way that for each mounting the identified angular sectors $j_l$ and $i_q$ are superimposed.

The defects in the location of the bores on the carrier as well as the concentricity defects of the pivots contribute to the tangential offset of the actual axis of rotation from the theoretical axis.

Thus, although the pivots and bores individually have real rotation axes (i.e. actual rotation axes) eccentric with respect to their theoretical rotation axes, assembly according to the process of the invention makes it possible to minimize the eccentricity of the rotation axes resulting from the pivot-bore assemblies.

The orientation of the pivot in the carrier during assembly step e) in such a way that the vectors $\vec{U}$ and $\vec{V}$ are not arranged in the same angular sector, allows the eccentricities of the actual rotation axes of the pivot and the bore to partially make up for each other.

The orientation of the parts during assembly then makes it possible to correct the relative tangential position defect of the planet gears, and consequently, to reduce the phenomenon of overloading of the planet gears of the pivots and bores, without modifying the manufacturing tolerances of the carrier bores and the pivots.

This process, which does not require pairing, also allows the interchangeability of parts during assembly or maintenance operations. Thus, whatever the pivot mounted in one of the bores, the orientation of the pivot in the bore, the process according to the invention allows the defect resulting from the pivot-bore assembly to be reduced.

Step e) of the process can also be carried out by means of a positioning device comprising complementary coupling means on the pivots and on the carrier.

The positioning device allows the pivot to be oriented and fixed in the bore in a desired orientation during assembly.

The coupling means may include first form-fitting coupling means carried by the carrier and second form-fitting coupling means carried by the pivots. The first and second form-fitting coupling means could be also called first and second shape engagement coupling means.

In this way, when mounting a pivot in a bore, the first coupling means carried by the carrier cooperate with the second coupling means carried by the pivot, so that the latter is oriented in the bore in such a way that the eccentricities of the pivot and the bore at least partially cancel each other out.

The first form-fitting coupling means may include a first projecting member arranged in the angular sector $j_l$, the second form-fitting coupling means including an insertion opening of said first member.

The first member may be suitable for placement in k holes each disposed at the periphery of a bore and in a sector $j_l$, and step d) further includes the following step:

inserting the first member into the l-th hole positioned in the angular sector $j_l$.

Each angular sector of each pivot may include a second coupling means formed in a radial protrusion $E_q$ at the periphery of the pivot, step c) including the performance of mistake proofing when mounting the opening of the radial protrusion $E_q$ in said sector $j_l$. The mistake proofing process consists in removing radial protrusions that are not included in the identified angular sector $i_q$.

Thus, once steps c) and d) of the process according to the invention have been carried out, each bore comprises a member carried by the carrier and located in the angular sector $j_l$ comprising the vector $\vec{U}$ and each pivot comprises a radial protrusion $E_q$ comprising an opening, capable of cooperating with the member. The radial protrusion $E_q$ is located in the angular sector $i_q$ comprising vector $-\vec{V}$. In this way, the angular sectors $j_l$ and $i_q$ respectively for each of the bores and each of the pivots are visually identified. It is easier to deduce the angular sectors where the actual axes of the bores and pivots are positioned.

Step d) may also include the following step:

orienting the pivot so as to insert the first member carried by the carrier into the opening of the remaining radial protrusion $E_q$ carried by the pivot.

Thus, by mounting the pivot so as to insert the member into the opening of the remaining radial protrusion $E_q$ of the pivot, it is ensured that the pivot is mounted in the bore while orienting it so as the identified angular sectors $j_l$ and $i_q$ of the bore and the pivot respectively are superimposed.

By superimposing the angular sectors $j_l$ and $i_q$, the vectors $\vec{U}$ and $\vec{V}$ are not arranged in the same angular sector, which means that the position defect of the real axes of the pivot and the bore make up for each other, at least in part.

In addition, the cooperation of the member and the opening of the radial protrusion $E_q$ allows the orientation errors during mounting the pivot in the bore to be reduced.

This process is an industrially viable solution, which also avoids pairing the bores of a carrier with the associated pivots.

The pivots and bores are respectively divided into n angular sectors k such that n can be greater than or equal to k.

Thus, when n is greater than k, the position of the actual rotation axis is more precisely identified on the pivot while avoiding cutting the bore into as many angular sectors. As mentioned above, each of the angular sectors of the bores includes holes arranged around the periphery of the bores on the carrier. Such large numbers of holes on the carrier can contribute to its mechanical weakening. Therefore, by limiting the number of angular sectors k such that n is greater than k, the mechanical weakening of the carrier resulting from the formation of the holes is reduced and better controlled.

In a practical example of embodiment of the invention, n and k can be between 3 and 8, including terminals.

The invention also concerns an epicyclic or planetary gear train that can be obtained by the process described above.

In addition, the invention relates to an epicyclic gear train comprising a planet gear carrier having bores in which pivots are arranged, the bores and pivots comprising coupling means capable of cooperating with one another to maintain the pivot in a predetermined orientation in the bore, said coupling means of the bores and pivots being respectively arranged in an angular sector comprising a vector $\vec{U}$ oriented from a theoretical axis towards a real axis and in an angular sector comprising a vector $-\vec{V}$, the vector $\vec{V}$ being oriented from a theoretical axis towards a real axis.

For example, the coupling means of the bores may include a projecting member.

Also, the coupling means of the pivots may include an opening, having a shape suitable for receiving the coupling means of the bores.

In addition, the opening is formed in a radial protrusion $E_q$ carried by the pivot and is suitable for receiving said projecting member.

The invention will be better understood and other details, characteristics and advantages of the invention will appear when reading the following description, which is given as a non-limiting example, with reference to the attached drawings.

BRIEF DESCRIPTION OF THE FIGURES

FIGS. 7a, 7b and 7c illustrate the steps of the process according to the invention;

DETAILED DESCRIPTION

Figure 1:
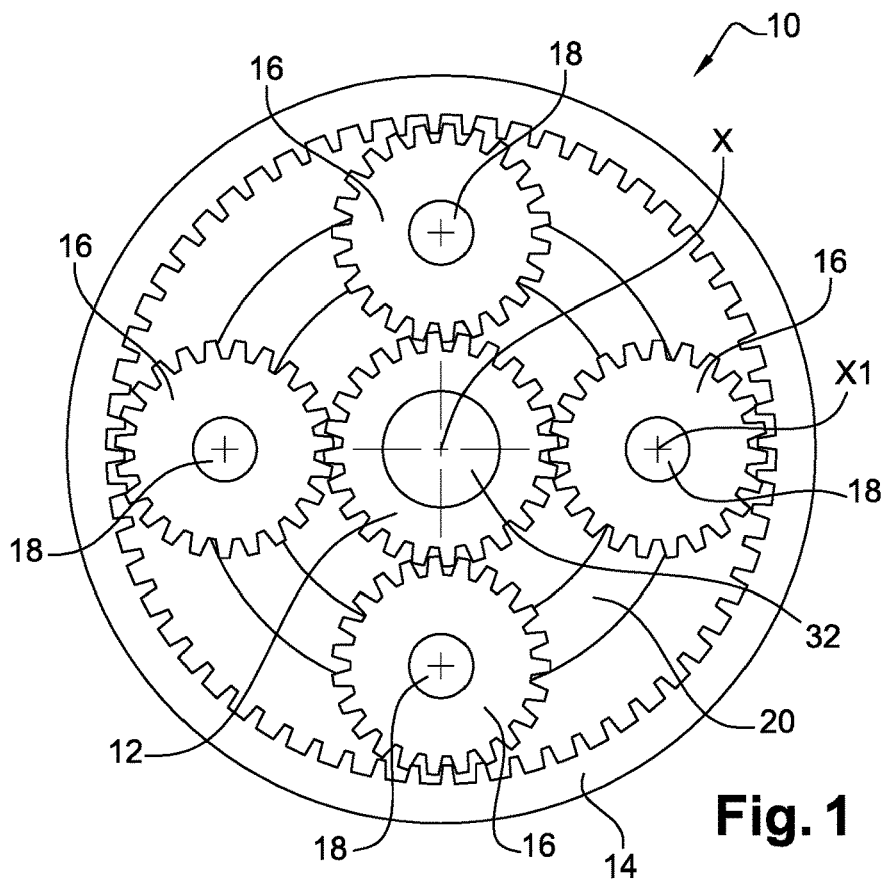
FIG. 1 is a front diagram of a gear train, axially from upstream.

FIG. 1 schematically illustrates the structure of an epicyclic or planetary gear train 10. This type of gear train 10 typically includes an inner planetary 12 (also called central pinion, sun or solar gear) and an outer planetary 14 (also called ring gear), the two gears being coaxial. The sun gear 12 can be rotated about its X axis, the ring gear 14 can be fixed, or rotationally coupled to a propeller as in the case of a turboprop or an fan impeller as in the case of a double flow turbojet. The train gear 10 further comprises planet gears 16 mounted to be rotatably movable on pivots 18 of a planet gear carrier 20. Each planet gear 16 meshes with both the sun gear 12 and with the ring gear 14. The carrier 20 is fixed or able to pivot about the axis X of the sun gear 12 and the ring gear 14. The inlet can be formed by the sun gear 12 and the outlet by the planet gear carrier 20.

In another example, the carrier 20 can be fixed or rotatably coupled to a propeller of a turboprop or a fan impeller of a dual-flow turbojet engine.

Figure 2:
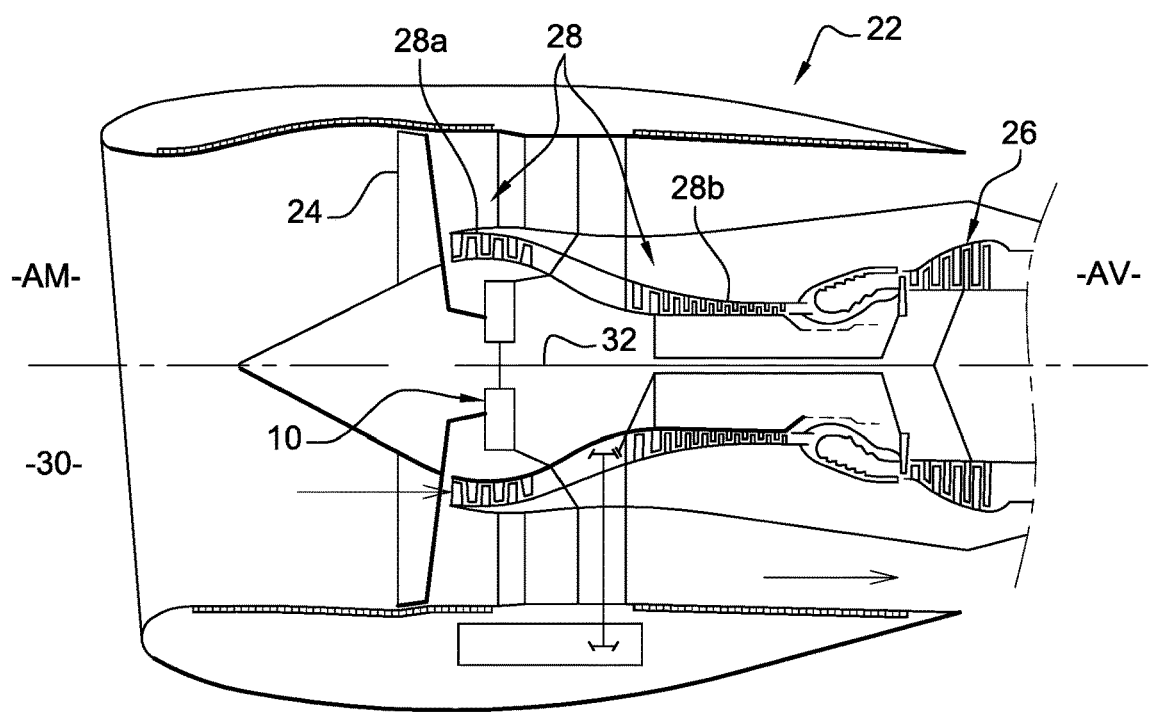
FIG. 2 is a longitudinal diagram of a turbine engine.

FIG. 2 schematically illustrates an aircraft turbine engine 22 in which gear trains 10 are used as speed reducers to reduce the rotational speed of a rotor, such as a fan impeller 24, independently from the rotational speed of at least one turbine 26 coupled axially downstream to at least one compressor 28 with which the turbine engine is also equipped. First the front air inlet 30, then the fan impeller 24 and compressor 28 are passed through by air.

The central pinion, or sun gear 12, surrounds and is then fixed in rotation to the shaft 32 of the compressor 28, as illustrated for example in FIGS. 1 and 2. In particular, the gear train 10 can be mounted in a radially formed annular chamber inside a low-pressure compressor 28a arranged downstream of the fan impeller 24 and upstream of a high-pressure compressor 28b, as shown in FIG. 2.

As can be seen in FIG. 1, the alignment of the teeth of the planet gears with the teeth of the sun 12 and ring gears 14 is necessary for the proper operation of gear train 10 and to limit maintenance operations.

Figure 3:
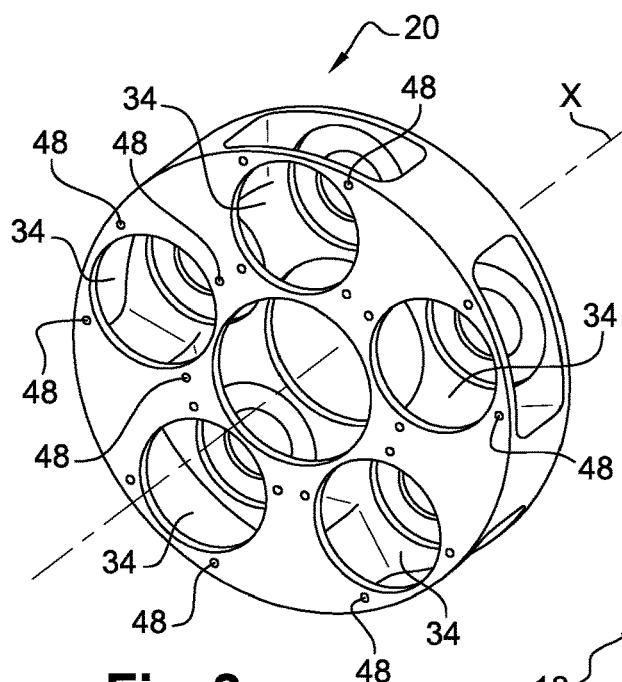
FIG. 3 is a schematic view of a planet gear carrier according to the invention.

Incorrect positioning of planet gears 16 in the bores 34 of the carrier 20, visible in FIG. 3, results in misalignment of the teeth of planet gears 16 with the teeth of the sun gear 12 and the ring gear 14. This results in a disparity of the power passing through the planet gears 16 leading to early wear and tear of the teeth.

It is therefore necessary to provide a solution to reduce the misalignment of planet gears 16 as much as possible when assembling such gear trains 10.

For this purpose, as shown in FIGS. 7a, 7b, and 7c, a process for the assembly of gear trains 10 is proposed. Mounting can be carried out from at least one pivot 18 and one carrier 20 with one or several bores 34.

FIG. 3 illustrates an example of a carrier 20 according to the invention, from which an epicyclic train is assembled. It has five bores 34 regularly distributed around the X axis and dimensioned so that a pivot 18 can be mounted therein. An example of a pivot 18 is shown in FIG. 5. Pivot 18 comprises an axis 36, the diameter of which is dimensioned in such a way that it can be arranged in the bores 34 of the carrier 20. Axis 36 is generally cylindrical or frustoconical, one end of which being prolonged by an annular linking part 38 extending radially outwards (FIG. 4).

Figure 4:
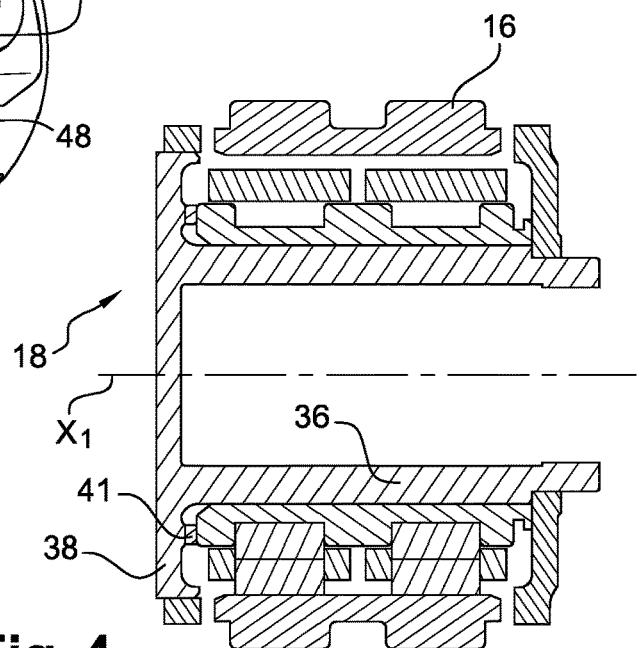
FIG. 4 is a cross-sectional view of a pivot mounted in a bore of a carrier.
Figure 5:
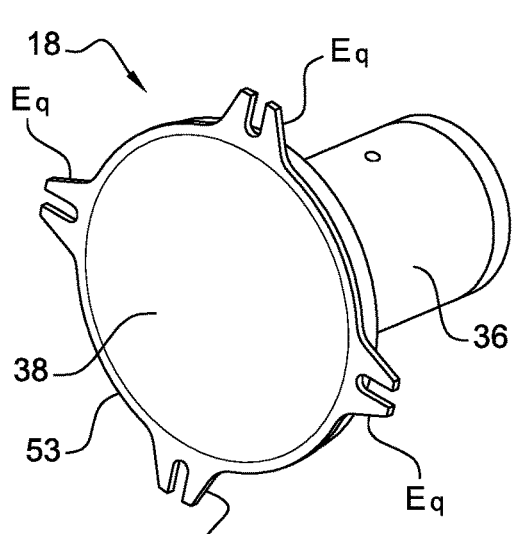
FIG. 5 is a schematic view of a pivot according to the invention before identification of angular sector $i_q$.

The mounting of a pivot 18 in a bore 34 of a carrier 20 is also visible in FIG. 4. Axis 36 of pivot 18 is arranged inside the bore 34 of the carrier 20 so that the linking part 38 rests on the surface 41 of the carrier at the periphery of the bore. The axis 36 of pivot is freely rotating in bore 34.

In the example shown in FIGS. 7a, 7b, and 7c, the process is applied to two bores 34, one carrier 20 or two separate carriers 20, and two pivots 18.

The first step of the process consists in measuring the position of a real rotation axis 51 of each of the pivots 18 and the position of a real axis 40 of each of the bores 34 of the carrier(s). As shown in FIG. 7a, the measurement, in this first step, gives the position of the real rotation axis 51 (FIG. 4) with respect to the theoretical rotation axis 52 of each of the pivots 18 and the position of the real axis 40 with respect to the theoretical axis 42 of each of the bores 34.

For bores 34, the eccentricity of the real axis 40 with respect to the theoretical axis 42 is partly due to manufacturing defects, which affect in particular the position of the bores 34 in the carrier. In the case of pivots 18, this eccentricity is explained by manufacturing defects affecting in particular the concentricity of pivots 18.

The three-dimensional position of the real axes, respectively of the pivots and the bores, is measured using a dedicated machine. This machine allows, by palpating the circumference of the bore and the pivot, to determine, by calculation, the actual position of the centre and therefore the actual rotation axis of the pivot and the actual rotation axis of the bore.

The first step thus makes it possible to know the relative position of the real axis 40 with respect to the theoretical axis 42 of the bores 34 as well as the position of the real rotation axis 51 with respect to the theoretical rotation axis 52 of the pivots 18 to be assembled.

To characterize the relative positions of the real axes 40, 51 with respect to the theoretical axes 42, 52 for each of the bores and pivots, vectors $\vec{U}$ and $\vec{V}$ are defined in a third and fourth step, respectively, also illustrated in FIGS. 7a, 7b and 7c.

For each bore 34, a vector $\vec{U}$ is defined. The vector $\vec{U}$ is oriented from the theoretical axis 42 to the real axis 40 and has a magnitude equal to the distance between the theoretical rotation axis 42 and the real axis 40 of bore 34.

Similarly, for each pivot 18 a vector $\vec{V}$ is defined. The vector $\vec{V}$ is oriented from the theoretical rotation axis 52 towards the actual rotation axis 51 and has a magnitude equal to the distance between the theoretical rotation axis 52 and the actual rotation axis 51 of the pivot 18.

In a practical embodiment, compatible with the industrialization of the parts, the process includes a second step consisting in regularly and independently dividing the pivots 18 into several equal angular sectors and the bores 34 of the carrier 20 into several equal angular sectors around their respective theoretical axes 42. Thus, pivots 18 and bores 34 are independently regularly divided into n and k angular sectors extending around their respective theoretical axes 42, n and k possibly being equal, as illustrated by FIGS. 7a, 7b and 7c, where n=k=4.

This division into angular sectors makes it possible to locate in which angular sector of the part are located the vectors $\vec{U}$ and $\vec{V}$, and therefore the real rotation axes 51 of the pivots 18 and the real axes 40 of the bores 34. The directional orientation of each bore and pivot can then be deduced.

Such a division into angular sectors also makes it possible to identify, in the third and fourth steps, the angular sectors $i_q$ and $j_l$, respectively for each pivot 18 and each bore 34, including respectively the vectors $-\vec{V}$ and $\vec{U}$.

The fifth step of the process, illustrated in FIG. 7c, consists in mounting one of the pivots 18 in bore 34 and orienting it angularly in such a way that for each assembly 44 the identified angular sectors $j_l$ and $i_q$ are superimposed. In other words, pivot 18 is mounted and oriented in one of the bores 34 so that the actual rotation axes 51 of pivot 18 and the actual axes 40 of bore 34 of assembly 44, defined by vectors $\vec{U}$ and $\vec{V}$, make up for each other, at least partially.

For this purpose, pivot 18 is oriented so that the identified angular sectors $j_l$ and $i_q$ are superimposed.

As shown in FIG. 7c, the pivots 18 may be mounted indifferently in either of the bores 34. However, during assembly 44, the pivot 18 is mounted such that the vectors $\vec{U}$ and $\vec{V}$ are not in the same angular sector, i.e. so that the identified angular sectors $j_l$ and $i_q$ are superimposed.

This process does not require pairing of parts, so that pivots 18 can be mounted in all bores 34 provided that the orientation of pivot 18 is respected.

In practice, the fifth step of the process is carried out by means of a positioning device. The positioning device includes additional coupling means on the pivots 18 and on the carrier 20. The positioning device allows the pivot 18 to be oriented in the bore 34 of the carrier 20 and fixed in the desired orientation during assembly. In practice, it will be understood hereinafter that the device performs mistake proofing when mounting a pivot 18 in a bore 34, avoiding inappropriate mounting of a pivot 18 in a bore 34 which would lead, contrary to the desired result, to an increase in teeth misalignment.

As shown in FIGS. 7a, 7b and 7c, the coupling means include first form-fitting coupling means carried by the carrier. These first coupling means include a first member 46 capable of being placed in a projecting position in holes 48 arranged at the periphery of bores 34. In particular, holes 48 are arranged so that there is only one hole 48 per angular sector for each of the bores 34 of the carrier 20, as shown in FIG. 3.

For each of the bores 34, the fourth step of the process also includes a step of inserting the first member 46 into the hole 48 positioned in the angular sector $j_l$, which also includes the vector $\vec{U}$ for each of the bores 34. This step thus makes it possible, for each bore 34, to visually identify the angular sector where the real axis 40 of bore 34 is located, and to provide a coupling means that will then help to "orient" the pivot 18 in bore 34, i.e. in an angular position leading to a reduction in teeth misalignment. In FIG. 7b, which partially illustrates this step, pins are arranged in the angular sectors $j_2$ and $j_4$ comprising the vector $\vec{U}$ of these two bores 34.

As shown in FIGS. 7a, 7b and 7c, the coupling means include second form-fitting coupling means carried by the pivots 18. The second form-fitting coupling means includes an introduction opening 50, so that a first member 46, for example a pin, can be received within this introduction opening 50. In particular, as illustrated in FIG. 5, each pivot includes second coupling means that are radial protrusions $E_q$ of the circumference 53 of pivot 18. The radial protrusions $E_q$ at the periphery 53 of the pivots 18 are arranged at the periphery of the linking part 38. In particular, these radial protrusions $E_q$ are arranged so that there is only one protrusion $E_q$ per angular sector for each of the pivots 18, as shown in FIG. 7a.

Figure 6:
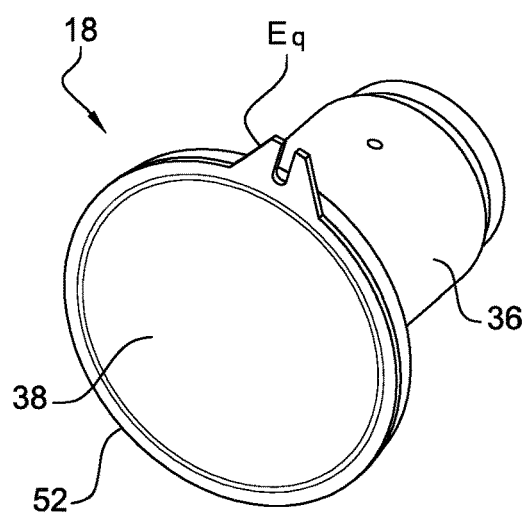
FIG. 6 is a schematic view of a pivot for which the angular sector $i_q$ has been identified.

For each pivot 18, the third step of the process also includes the performance a mistake proofing process when mounting the opening of the radial protrusion $E_q$ in said member 46 of sector $j_l$. This mistake proofing process consists in removing the radial protrusions $E_q$ that are not included in the identified angular sector $i_q$ including vector $-\vec{V}$. This step thus allows, for each pivot 18, to visually identify the angular sector located in the direction opposite to the angular sector in which the actual rotation axis 51 of pivot 18 is located, and to provide a coupling means that will then facilitate the "oriented" mounting of pivot 18 in bore 34. After machining, the pivots 18 only have one radial protrusion as shown in FIG. 6.

Following the third and fourth steps of the process, as shown in FIG. 7b, the pins 46, the first form-fitting coupling means carried by the carriers and the remaining radial protrusions $E_q$, the second form-fitting coupling means carried by the pivots, allow to identify, directly or indirectly, the position and orientation of the vectors $\vec{U}$ and $\vec{V}$.

The fifth step includes, in a practical embodiment of the process, a step of orienting the pivot 18 so as to insert the first projecting member 46 carried by the carrier 20 into the opening of the remaining radial protrusion $E_q$ carried by the pivot 18. As shown in FIG. 7c, the orientation of the pivot 18 in bore 34 so that pin 46 of bore 34 cooperates with the remaining radial protrusion $E_q$ of pivot 18 ensures that the actual rotation axis 51 of pivot 18 and the actual axis 40 of bore 34 are not located in the same angular sector.

By superimposing the visually identified angular sectors $j_l$ and $i_q$ on each of the bores 34 and pivots 18, it is ensured during assembly that $\vec{U}$ and $\vec{V}$ are arranged in such a way that the actual rotation axis 51 of the pivot 18 and the actual axis 40 of the bore 34 of the assembly 44 make up for each other, at least partially.

Figure 8:
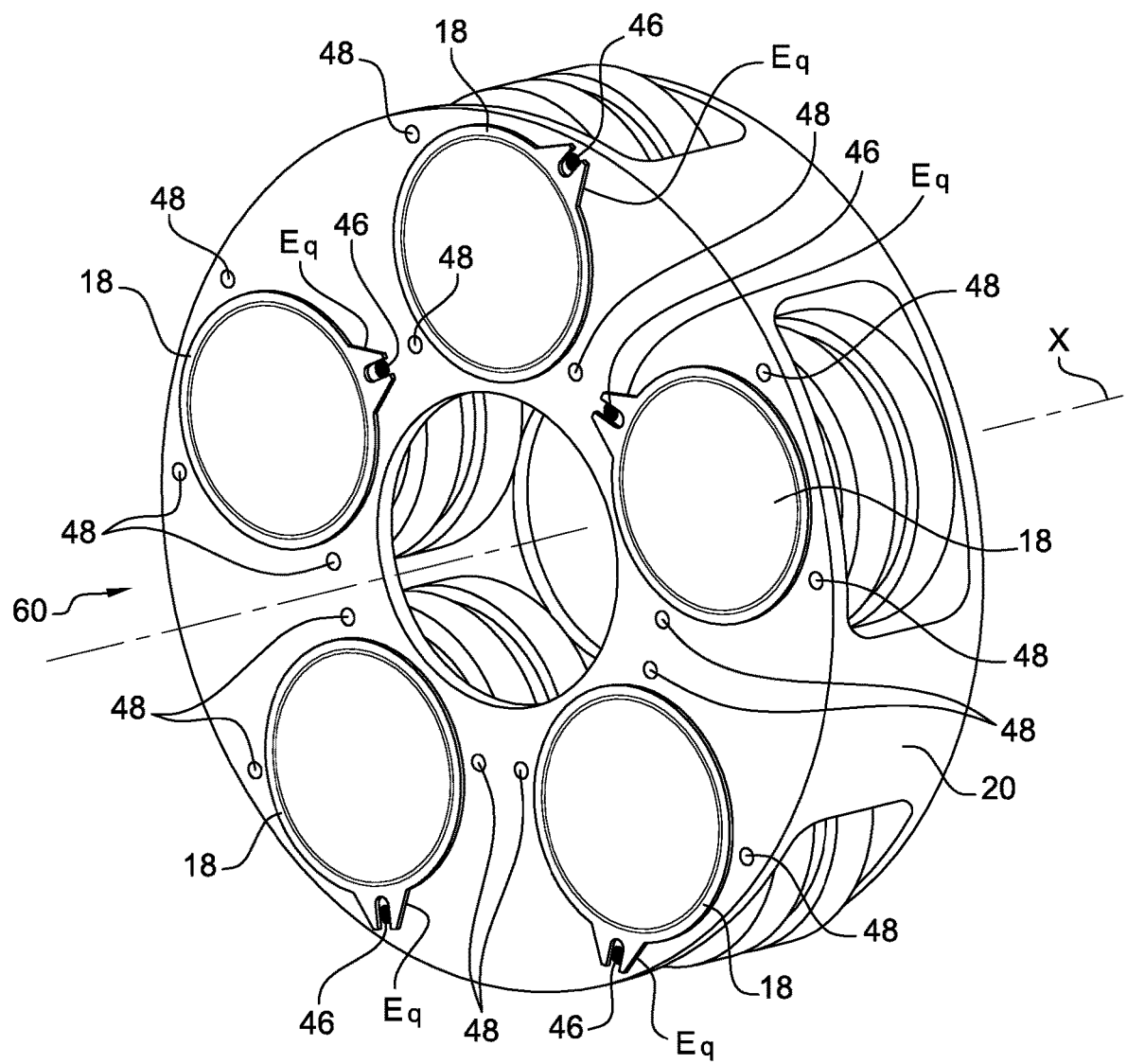
FIG. 8 is a schematic view of a gear train that can be obtained by the process according to the invention.

As shown in FIG. 8, the process results in an epicyclic train gear 60, in which the pivots 18 are oriented in bores 34, using the cooperation between the remaining radial protrusions $E_q$ of pivots 18 and the pins 46 arranged around the bores 34.

As shown in FIG. 7c, pivots 18 are interchangeable: they can be mounted in either of the bores 34, provided that pivots 18 are correctly oriented using their remaining radial protrusion $E_q$.

In the particular case where, for a bore 34, the vector $\vec{U}$ is positioned on the boundary between two angular sectors, one of the two sectors is randomly selected as the sector comprising the vector $\vec{U}$. Similarly for a pivot 18, when the vector $-\vec{V}$ is positioned on the boundary between two angular sectors, one of the two sectors is randomly selected as the sector comprising the vector $-\vec{V}$. According to one embodiment of the invention, the pivots 18 and the bores 34 are respectively in n and k angular sectors such that n can be greater than or equal to k.

According to another embodiment, n and k can be between 3 and 8, including terminals.

In particular, by limiting the number of angular sectors of bores 34, the number of holes 48 drilled around the periphery of bores 34 on carriers 20 is also limited. This allows limiting and controlling the weakening of the carrier 20 by the holes 48.

The invention claimed is:

1. A process for the assembly of a gear train (10) from at least one pivot (18) and a planet gear carrier (20) comprising one or more bores (34), each of the bores (34) being intended to receive one of the at least one pivot (18), the process comprising the following steps:
   a) measuring the position of a real axis (40) of each of said at least one pivot (18) and said one or more bores (34) of the carrier (20);
   b) dividing each of said pivots (18) into n angular sectors $i_1 \ldots i_q \ldots i_n$ extending about a theoretical axis (52) of said pivot and dividing each of said bores (34) of the carrier (20) into k angular sectors $j_1 \ldots j_l \ldots j_k$ extending about a theoretical axis (42) of said bore (34);
   c) for each pivot (18), defining a vector $\vec{V}$ oriented from the theoretical axis (52) to the real axis (51), and identifying the angular sector $i_s$ including vector $-\vec{V}$;
   d) for each bore (34), defining a vector $\vec{U}$ oriented from the theoretical axis (40) to the real axis (42), and identifying the angular sector $j_l$ including vector $\vec{U}$;
   e) for each bore (34) of the carrier (20), mounting a pivot (18) such that for each assembly (44) the identified angular sectors $j_l$ and $i_q$ are superimposed.

2. The process according to claim 1, wherein step e) is carried out by means of a positioning device comprising complementary coupling means on the pivots and on the carrier.

3. The process according to claim 2, wherein the coupling means comprise first form-fitting coupling means carried by the carrier (20) and second form-fitting coupling means carried by the pivots (18).

4. The process according to claim 3, wherein the first form-fitting coupling means comprises a first projecting member (46) arranged in angular sector $j_i$ and wherein the second form-fitting coupling means comprises an opening (50) suitable for receiving said first member.

5. The process according to claim 4, wherein the first member (46) is adapted to be received in k holes (48) each arranged around a bore (34) and in a sector $j_l$, and wherein step d) further comprises the following step:
 inserting the first member (46) into the l-th hole (48) positioned in the angular sector $j_l$.

6. The process according to claim 4, wherein each angular sector of each pivot (18) comprising a second coupling means formed by a radial protrusion $E_q$ at the periphery (53) of the pivot (18), step c) comprising the performance of mistake proofing when mounting the opening (50) of the radial protrusion $E_q$ in said member (46) of sector $j_l$.

7. The process according to claim 5, wherein each angular sector of each pivot (18) comprising a second coupling means formed by a radial protrusion $E_q$ at the periphery (53) of the pivot (18), step c) comprising the performance of mistake proofing when mounting the opening (50) of the radial protrusion $E_q$ in said member (46) of sector $j_l$.

8. The process according to claim 6, wherein the performance of the mistake proofing consists in removing radial protrusions $E_q$ that are not included in the angular sector $i_q$.

9. The process according to claim 8, wherein step d) further comprises the following steps:
 orienting the pivot (18) so as to insert the first member (46) carried by the carrier (20) into the opening (50) of the remaining radial protrusion $E_q$ carried by the pivot (18).

10. The process according to claim 1, wherein n is greater than or equal to k.

11. The process according to claim 1, wherein n and k are between 3 and 8, including terminals.

12. A train gear (60) which can be obtained by the process according to claim 1.

13. A process according to claim 1, wherein the gear train is an epicyclic or planetary gear train.

14. A gear train according to claim 12, wherein the it is an epicyclic train gear.

* * * * *